US012803873B2

(12) United States Patent
Chen et al.

(10) Patent No.: US 12,803,873 B2
(45) Date of Patent: Nov. 17, 2026

(54) METHOD AND SYSTEM FOR EFFICIENT CONFIGURATION OF TIME-SENSITIVE NETWORK BASED ON HARDWARE ACCELERATION

(71) Applicant: SHANGHAI JIAO TONG UNIVERSITY, Shanghai (CN)

(72) Inventors: Cailian Chen, Shanghai (CN); Qimin Xu, Shanghai (CN); Xinping Guan, Shanghai (CN); Yanzhou Zhang, Shanghai (CN); Lei Xu, Shanghai (CN); Shouliang Wang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 113 days.

(21) Appl. No.: 18/861,702

(22) PCT Filed: Aug. 2, 2022

(86) PCT No.: PCT/CN2022/109628

§ 371 (c)(1),
(2) Date: Oct. 30, 2024

(87) PCT Pub. No.: WO2024/007395

PCT Pub. Date: Jan. 11, 2024

(65) Prior Publication Data

US 2025/0300885 A1 Sep. 25, 2025

(30) Foreign Application Priority Data

Jul. 8, 2022 (CN) ......................... 202210804844.6

(51) Int. Cl.

| | |
|---|---|
| ***H04L 41/0823*** | (2022.01) |
| ***H04L 43/04*** | (2022.01) |
| ***H04L 47/625*** | (2022.01) |

(52) U.S. Cl.
CPC .......... *H04L 41/0823* (2013.01); *H04L 43/04* (2013.01); *H04L 47/625* (2013.01)

(58) Field of Classification Search
CPC .... H04L 41/0823; H04L 43/04; H04L 47/625
See application file for complete search history.

(56) References Cited

U.S. PATENT DOCUMENTS

2010/0272093 A1* 10/2010 Raravi ............... G05B 19/4185 370/348
2021/0073689 A1* 3/2021 Finzi ....................... H04L 67/62

(Continued)

FOREIGN PATENT DOCUMENTS

| | | |
|---|---|---|
| CN | 112291161 A | 1/2021 |
| CN | 112565107 A | 3/2021 |
| CN | 114448894 A | 5/2022 |

OTHER PUBLICATIONS

International Search Report mailed on Dec. 27, 2022, issued in the corresponding International Application No. PCT/CN2022/109628, filed on Aug. 2, 2022; 6 pages total.

(Continued)

*Primary Examiner* — Viet D Vu
(74) *Attorney, Agent, or Firm* — Christensen O'Connor Johnson Kindness PLLC

(57) ABSTRACT

The present invention discloses a method and system for efficient configuration of a time-sensitive network based on hardware acceleration, pertaining to the field of wired communication networking technology. The method includes an acquisition step, a preprocessing step, a scheduling step, a generation step and a deployment step. The scheduling step, according to an operating state of a scheduling engine, based on attribute information of to-be-configured data streams, selects a time slot length, calculates a hyperperiod, depending on a size of the hyperperiod, carries out any of hyperperiod based parallel scheduling or conflict-group based (Continued)

parallel scheduling, obtaining a scheduling result, and thereby generates and deploys a configuration scheme to network devices. The present invention is able to, based on on-site network and terminal device conditions, derive global deterministic scheduling and configuration schemes and enables rapid distribution and deployment.

10 Claims, 5 Drawing Sheets

(56) References Cited

U.S. PATENT DOCUMENTS

| | | | | |
|---|---|---|---|---|
| 2021/0306910 | A1 | 9/2021 | Guo et al. | |
| 2022/0166677 | A1* | 5/2022 | Jabbar | H04L 41/12 |

OTHER PUBLICATIONS

Written Opinion of the International Searching Authority mailed on Dec. 13, 2022, issued in the corresponding International Application No. PCT/CN2022/109628, filed on Aug. 2, 2022; 6 pages total.

* cited by examiner

METHOD AND SYSTEM FOR EFFICIENT CONFIGURATION OF TIME-SENSITIVE NETWORK BASED ON HARDWARE ACCELERATION

RELATED APPLICATIONS

This application is a continuation-in-part (CIP) of International Application No. PCT/CN2022/109628 filed Aug. 2, 2022, which claims priority to Chinese Patent Application No. 202210804844.6 filed on Jul. 8, 2022, the disclosures of which are incorporated herein in their entirety by reference.

FIELD OF THE INVENTION

The present invention relates to the field of wired communication networking technology, and particularly to a method and system for efficient configuration of a time-sensitive network based on hardware acceleration.

DESCRIPTION OF THE PRIOR ART

With the continuous development of information technology, human-dominated communication networks are gradually evolving toward Internet of Everything where there is distributed network information in need of real-time and deterministic forwarding and transmission. Industrial automated production lines are also rapidly transitioning from small-scale closed networks toward Industrial Internet of Things (IIoT), and the latter is more demanding in terms of real-time characteristics, determinism and transmission jitter. However, current IEEE 802.1 Ethernet technology falls short in meeting the requirements of IIoT's development due to its best-effort transmission mode, which leads to unstable latency and a trailing effect. A series of industrial network protocols such as Profinet and EtherCAT proposed and applied in some industrial fields have enhanced to some extent the transmission capacity of networks. However, mutual non-compatibility, low bandwidth, lack of interoperability and high deployment costs of these network protocols make them difficult to build a large-scale ubiquitous network of things. In order to enhance the deterministic and real-time characteristics of data exchange in Ethernet bridges, the IEEE 802.1 TSN developed time-sensitive networking (TSN).

Specifically, IEEE 802.1Qbv specifies a programmable gating mechanism, called time-aware shaper (TAS), which operates by enabling and disabling precisely timed egress queues and is based on a predefined periodic schedule (i.e., Gate Control List, GCL) to enable deterministic transmission of time-sensitive (TS) streams to meet the stringent latency and jitter requirements. IEEE 802.1 Qch specifies a static GCL configuration mechanism, called cyclic queuing and forwarding (CQF), which can lower GCL design complexity through constructing ping-pong queues for cyclically and alternately buffering and forwarding TS streams. Moreover, in order for parameter configuration of the aforementioned GCL and other network devices to be achieved, IEEE 802.1Qcc specifies a completely centralized configuration architecture, which utilizes centralized user configuration (CUC) and centralized network configuration (CNC) units to establish connections between terminal devices and the network devices and enable the parameter configuration, wherein the CNC unit is configured for centralized network configuration. Despite the gating mechanism and configuration architecture specified in the TSN standards, which enable the construction of a deterministic network, it is still necessary to further design particular scheduling and configuration schemes for deterministic transmission and configuration distribution for TS streams. Moreover, presently, how to design a CNC unit capable of generating and deploying configuration and scheduling schemes remains a problem requiring urgent solution.

For deterministic and real-time scheduling of TS streams in a time-sensitive network (TSN), most works rely on modeling approaches such as satisfiability modulo theories (SMT) and integer linear programming (ILP) for ensuring deterministic and real-time transmission behavior of TS streams. However, these works make trade-offs for schedulability at the expense of considerable runtime, making them only suitable for small and medium-sized networks but not for large-scale networks with massive, complex data streams. Although some optimized scheduling schemes such as incremental scheduling and group scheduling take into consideration the balance between schedulability and runtime and help to some extent to solve the scheduling problem of large-scale TSNs. However, they still fail to meet the scheduling requirements of large-scale networks.

Although flow injection time-based scheduling (FITS) provides a GCL design method for CQF configuration, which enables scheduling scheme generation through time slot allocation and selection within ranges of periodic GCL cycles, this method still suffers from relatively high scheduling complexity, and in large-scale network environments with complex data streams, its serialized time slot allocation process will take up a lot of computing time. Therefore, it remains a great challenge to design an engine capable of rapid scheduling as required by deterministic transmission of large-scale networks with complex flows.

Among the prior-art techniques, some can provide configuration solutions which involve only process flows but not particular configuration equipment or how configuration elements are designed. Some techniques can derive deterministic global scheduling schemes, but limited by priori acquisition of priorities and complexity of the design, the optimality and rapidity of configuration are subpar. Some techniques can improve local load balancing of network traffic, but they fails to take into account the design of a global and deterministic transmission scheme.

To sum up, the prior art is associated with disadvantages including:

1. The existing TSN configuration solutions provide only the functions of distributing configuration commands and distributing configuration schemes, but not the design of internal structures of a CNC unit, i.e., configuration equipment and co-design of a built-in scheduling engine therein.
2. The existing TSN scheduling solutions focus more on packet scheduling. Such meticulous scheduling can barely satisfy the scalability requirements of complex large-scale networks and will lead to significant time delays in network deployment during practical production, affecting production efficiency. Meanwhile, they impose stringent or even hard-to-meet requirements on consistency between configuration elements and actual network conditions.
3. The existing hardware-enabled network data scheduling structures that support the deployment of random traffic scheduling methods cannot address the deployment needs of deterministic TSN scheduling methods because non-deterministic latency and jitter will be caused during traffic transmission, which will affect production efficiency.

4. In the existing TSN scheduling solutions, the design of their scheduling methods does not take into account the physical properties of their hardware deployment platforms. Therefore, it is impossible to optimize the scheduling methods by leveraging the hardware platforms' properties. This not only tends to cause a waste of the hardware deployment platforms' performance, but also limits the generation speed of current scheduling and configuration schemes.
5. Subject to limited storage space and specific operating modes, direct deployment and application of the existing scheduling methods on FPGA and other dedicated hardware platforms are difficult. Both their feasibility and performance are difficult to guarantee, and there are technical barriers and physical resource limitations.

Therefore, those skilled in the art are directing their effort toward developing a unit and method for efficient configuration of a TSN based on hardware acceleration, which guarantees determinism and feasibility of scheduling schemes for the transmission of time-sensitive (TS) streams while shortening the time required by a scheduling engine to generate the scheduling schemes and guaranteeing stability and rapidity of the scheduling engine, thereby providing scheduling and configuration capabilities that can meet the requirements of large-scale networks on industrial sites.

SUMMARY OF THE INVENTION

In view of the above described shortcomings of the prior art, the technical problems to be solved by the present invention include:

1. How to design a method for a scheduling engine core adapted to FPGA and other dedicated hardware platforms, which brings the parallel nature and deterministic computing power of these hardware platforms into full play, guarantees stability and rapidity of the scheduling engine and provides scheduling and configuration capabilities that can meet the requirements of large-scale networks on industrial sites.
2. How to design an efficient deterministic scheduling engine for TSNs, which guarantees determinism and feasibility of scheduling schemes for the transmission of TS streams while shortening the time required by the scheduling engine to generate the scheduling schemes.
3. How to design an efficient scheduling engine accelerator by utilizing a dedicated hardware platform with limited on-chip resources, which can speed up computation of a TSN scheduling engine and facilitate rapid generation and deployment of configuration schemes.
4. How to design a reasonable and efficient TSN configuration unit according to the characteristics of a TSN configuration method and provide an associated approach for implementing a scheduling engine for generating configuration parameter for network devices.

To achieve the above objects, the present invention provides a method for efficient configuration of a TSN based on hardware acceleration, including the steps of:

in an acquisition step, acquiring attribute information of data streams;

in a preprocessing step, preprocessing the attribute information of data streams acquired to derive attribute information of to-be-configured data streams;

in a scheduling step, selecting a time slot length based on the attribute information of to-be-configured data streams, calculating a hyperperiod therefrom, and performing corresponding parallel scheduling based on a size of the hyperperiod, thereby obtaining a scheduling result;

in a generation step, generating a scheduling scheme based on the scheduling result and further generating a configuration scheme;

in a deployment step, deploying the configuration scheme to network devices.

Additionally, the preprocessing step includes:

conducting dimension unification on the attribute information of data streams and sorting the streams, the attribute information of data streams including information of requests for transmission of the traffic streams, attributes of the data streams to be transmitted and information of network available resources.

Additionally, the method further includes:

mounting the attribute information of to-be-configured data streams together with the information of network available resources and sending a scheduling request signal.

Additionally, when an operating state of the scheduling engine is an idle state, the scheduling request signal is responded to, the to-be-configured quantity information and the information of network available resources that are mounted are acquired, and the operating state of the scheduling engine is set to a busy state; and when the operating state of the scheduling engine is the busy state, the scheduling request signal is not responded to.

Additionally, the scheduling step includes:

obtaining time-slotted sending periods through dividing a sending period of each of the to-be-configured data streams by the time slot length;

calculating the hyperperiod based on the time-slotted sending periods.

Additionally, the scheduling step includes:

in the event that the hyperperiod is greater than or equal to a threshold, implementing hyperperiod based parallel scheduling, wherein the hyperperiod based parallel scheduling includes:

buffering the attribute information of to-be-configured data streams that has passed data quality checks and successively incrementally retrieving the data streams for scheduling;

deriving feasible forwarding time slot ranges based on the sending periods and worst-case latency requirements of the data streams and successively sending the feasible forwarding time slot ranges to parallel determination units;

monitoring the hyperperiod and activating a corresponding number of the parallel determination units, making a determination as to time slot occupancy at corresponding forwarding time slots of a current to-be-scheduled stream by taking in account an amount of network time slot occupancy by scheduled traffic, wherein each parallel determination unit corresponds to one time slot within a range of the hyperperiod and independently make a determination of whether the specific time slot is to be occupied and a corresponding time slot occupancy check;

acquiring the time slot occupancy amount information, performing forwarding time slot filtering based on corresponding amounts of time slot occupancy at different forwarding time slots, storing filtering results and network time slot occupancy information upon the completion of the current traffic scheduling, obtaining the scheduling result, if the filtering fails, terminating the scheduling and sending an error warning signal, causing the hardware accelerator module to return to the idle state.

Additionally, the determination as to time slot occupancy is made under the condition that, over transmission links for a current to-be-scheduled data stream, if a given specific time slot is congruent with a corresponding forwarding time slot of the current to-be-scheduled stream with respect to the sending period of the current to-be-scheduled data stream, it is indicated that the time slot is to be occupied, and a corresponding amount of time slot occupancy is a sum of packet sizes of all scheduled data stream(s) by which the specific time slot is occupied and of the current to-be-scheduled data stream.

Additionally, the scheduling step includes:

in the event that the hyperperiod is smaller than the threshold, implementing conflict-group based parallel scheduling, wherein the conflict-group based parallel scheduling includes:

buffering the attribute information of to-be-configured data streams that has passed data quality checks and successively incrementally retrieving the data streams for scheduling;

deriving feasible forwarding time slot ranges based on attribute information of the data streams such as their sending periods and worst-case latency requirements;

making a two-stage parallel determination as to time slot occupancy at corresponding forwarding time slots of a current to-be-scheduled stream by taking in account information of network time slot occupancy by scheduled traffic, obtaining time slot occupancy amount information;

acquiring the time slot occupancy amount information until all the feasible forwarding time slots for the current to-be-scheduled stream have been checked, at this point, carrying out forwarding time slot filtering based on the corresponding time slot occupancy amount information at the different forwarding time slots, storing filtering results and network time slot occupancy information upon the completion of the current traffic scheduling, obtaining the scheduling result, if the filtering fails, terminating the scheduling and sending an error warning signal, causing the hardware accelerator module to return to the idle state.

Additionally, the two-stage parallel determination includes:

a first-stage determination, the first-stage determination used to determine time slot occupancy relationship between the current to-be-scheduled data stream and scheduled data stream(s), wherein the time slot occupancy relationship is determined under the condition that, if there is an overlapped transmission link in routes for a given specific scheduled data stream and current to-be-scheduled stream, then over the overlapped link, if the corresponding forwarding time slots of the two satisfy that the difference between the time slots is divisible by the greatest common divisor of the sending periods of the two data streams, it is indicated that the two data streams will be certainly co-existing in a certain time slot for the link, i.e., there is time slot co-occupancy.

Additionally, the two-stage parallel determination further includes:

a second-stage determination, the second-stage determination being implemented to, based on a result of the first-stage determination, perform set operations with conflict group sets reflecting time slot occupancy of scheduled data stream sets over the links, wherein each parallel determination unit corresponds to one of the conflict group sets and independently completes a check of one type of time slot occupancy for the current data stream, wherein the time slot occupancy check is made on the basis of performing an intersection operation between scheduled data stream(s) with time slot co-occupancy with the current to-be-scheduled data stream over the transmission links thereof and a particular one of the conflict group sets, adding the current to-be-scheduled stream to the intersection and obtaining the time slot occupancy information by summing packet sizes of the data streams in the set.

Additionally, the generation step includes:

generating the scheduling scheme based on the scheduling result;

issuing a scheduling completion signal, setting the operating state of the scheduling engine to the idle state; and in response to the scheduling completion signal, generating gate control list configuration information for the network devices by taking into account the scheduling scheme and determining a distribution time and a deployment time for the configuration information, thereby forming the configuration scheme.

Additionally, the deployment step includes:

issuing a configuration distribution command based on the distribution time and distributing the configuration scheme to the network devices using a remote network management protocol, thereby accomplishing the configuration of the network devices.

The present invention also provides a system for efficient configuration of a TSN based on hardware acceleration, including:

an acquisition module, the acquisition module configured to acquire attribute information of data streams;

a preprocessing module, the preprocessing module configured to preprocess the attribute information of data streams acquired to derive attribute information of to-be-configured data streams;

a scheduling module, the scheduling module configured to select a time slot length based on the attribute information of to-be-configured data streams, calculate a hyperperiod therefrom, and perform corresponding parallel scheduling based on a size of the hyperperiod, thereby obtaining a scheduling result;

a generation module, the generation module configured to generate a scheduling scheme based on the scheduling result and further generate a configuration scheme;

a deployment module, the deployment module configured to deploy the configuration scheme to network devices.

Additionally, the scheduling module includes a calculation module, a hyperperiod based parallel scheduling module and a conflict-group based parallel scheduling module.

Additionally, the calculation module is configured to calculate time-slotted sending periods based on a sending period of each of the to-be-configured data streams and on the time slot length and calculate the hyperperiod based on the time-slotted sending periods.

Additionally, the hyperperiod based parallel scheduling module is configured to:

buffer the attribute information of to-be-configured data streams that has passed data quality checks and successively incrementally retrieve the data streams for scheduling;

derive feasible forwarding time slot ranges based on the sending periods and worst-case latency requirements of the data streams and successively send the feasible forwarding time slot ranges to parallel determination units;

monitor the hyperperiod and activate a corresponding number of the parallel determination units, make a determination as to time slot occupancy at corresponding forwarding time slots of a current to-be-scheduled stream by taking in account an amount of network time slot occupancy by scheduled traffic, wherein each parallel determination unit corresponds to one time slot within a range of the hyperperiod and independently make a determination of whether the specific time slot is to be occupied and a corresponding time slot occupancy check;

acquire the time slot occupancy amount information, perform forwarding time slot filtering based on corresponding amounts of time slot occupancy at different forwarding time slots, store filtering results and network time slot occupancy information upon the completion of the current traffic scheduling, obtaining the scheduling result, if the filtering fails, terminate the scheduling and send an error warning signal, causing the hardware accelerator module to return to the idle state.

Additionally, the conflict-group based parallel scheduling module is configured to:

buffer the attribute information of to-be-configured data streams that has passed data quality checks and successively incrementally retrieving the data streams for scheduling;

derive feasible forwarding time slot ranges based on attribute information of the data streams such as their sending periods and worst-case latency requirements;

make a two-stage parallel determination as to time slot occupancy at corresponding forwarding time slots of a current to-be-scheduled stream by taking in account information of network time slot occupancy by scheduled traffic, obtaining time slot occupancy amount information;

acquire the time slot occupancy amount information until all the feasible forwarding time slots for the current to-be-scheduled stream have been checked, at this point, carry out forwarding time slot filtering based on the corresponding time slot occupancy amount information at the different forwarding time slots, store filtering results and network time slot occupancy information upon the completion of the current traffic scheduling, obtaining the scheduling result, if the filtering fails, terminate the scheduling and send an error warning signal, causing the hardware accelerator module to return to the idle state.

Additionally, the generation module is configured to:

generate the scheduling scheme based on the scheduling result and issue a scheduling completion signal; monitor the scheduling completion signal, acquire the scheduling scheme, generate gate control list configuration information for the network devices by taking into account the scheduling scheme and determine a distribution time and a deployment time for the configuration information, thereby forming the configuration scheme.

The present invention further provides a device for efficient configuration of a time-sensitive network based on hardware acceleration, including a memory, a processor and a computer program stored in the memory and executable on the processor, characterized in that the processor is configured to be able to implement, when executing the computer program, steps in a method for efficient configuration of a time-sensitive network based on hardware acceleration.

The present invention also provides a computer-readable storage medium, storing thereon a computer program, which, when executed by a processor, is able to implement steps in a method for efficient configuration of a time-sensitive network based on hardware acceleration.

The present invention also provides a unit for efficient configuration of a TSN based on hardware acceleration, which includes a main control module, a hardware accelerator module and an information exchange module. The main control module acquires requests for transmission of traffic data streams, monitors conditions of devices in a network device layer, and collaborates with the hardware accelerator module to acquire a scheduling scheme and design a deployment scheme which is combined therewith into a complete configuration scheme for distribution to the network devices. The hardware accelerator module collaborates with the main control module via the information exchange module for design of the scheduling scheme and device configuration information. The information exchange module enables information exchange between the main control module and the hardware accelerator module, transmission of attribute information of to-be-configured data streams, network resource information, the scheduling scheme and the device configuration information. The hardware accelerator module includes a scheduling engine, and the scheduling engine includes a scheduling method selection unit. The scheduling method selection unit is responsible for selecting an operating method for the scheduling engine. When a to-be-configured traffic set is determined as being stream number complex, hyperperiod based parallel scheduling is selected and implemented. When a to-be-configured traffic set is determined as being stream attribute complex, conflict-group based parallel scheduling is selected and implemented.

Additionally, the main control module includes a CUC interaction unit, a condition monitoring unit, a configuration management unit, a remote control unit, a human-machine interface unit and a network interface unit.

The CUC interaction unit is used to collect requests of transmission of traffic data streams from terminal devices in a CUC unit, pass them to the configuration management unit and feed traffic information of the terminal devices and network device condition information back to the CUC unit. The condition monitoring unit is used to monitor operating conditions of on-site network devices and traffic stream transmission consistency in the configuration scheme and transmit the network device condition information to the configuration management unit and the CUC interaction unit.

The configuration management unit is used to generate the configuration scheme and issue a configuration distribution command and for co-design of the scheduling scheme with the hardware accelerator module via the information exchange module.

The remote control unit is used to enable remote access and management of the configuration unit.

The human-machine interface unit is used to enable local access and management of the configuration unit.

The network interface unit provides a communication interface and maintenance to the remote control, configuration distribution and other functions.

Additionally, the configuration management unit includes a preprocessing unit, a scheduling interface unit, a deployment design unit and a configuration distribution unit.

The preprocessing unit is used to perform data dimension unification, stream sorting and other preprocessing operations on the attribute information of to-be-configured data streams.

The scheduling interface unit is used to send the preprocessed attribute information of to-be-configured data streams and information of network available resources to the hardware accelerator module via the information exchange module and acquire the scheduling scheme and network device configuration information fed back from the hardware accelerator module.

The deployment design unit is used to generate GCL configuration information for the network devices by taking into account the scheduling scheme and determine distribution and deployment times for the configuration information, thus forming the configuration scheme.

The configuration distribution unit is used to issue the configuration distribution command according to the planned distribution time and accomplish distribution of the configuration scheme using a remote network management protocol configured in the network interface unit.

Additionally, the hardware accelerator module includes a resource information repository, the scheduling engine and a scheduling scheme repository.

The resource information repository is used to store the network resource information and the attribute information of to-be-configured data streams from the configuration management unit in the main control module, as well as scheduling condition information occurring during operation of the scheduling engine, such as network time slot occupancy information and transmission delays of the data streams.

The scheduling engine is used for generation of the scheduling scheme, parallel acceleration and forwarding time slot selection for each to-be-configured data stream.

The scheduling scheme repository is used to store the forwarding time slots for the data streams selected during operation of the scheduling engine, generate, based thereon, the scheduling scheme, and transmit it back to the configuration management unit in the main control module.

Additionally, the scheduling engine includes a data quality analysis unit, a time slot selection unit and the scheduling method selection unit.

The data quality analysis unit is used to perform data quality analysis on the information of network available resources and the attribute information of to-be-configured data streams stored in the resource information repository and to issue an error warning signal upon identifying any error.

The time slot selection unit is used to select a time slot length for GCL alternate forwarding, represent sending periods and worst-case latency requirements of the to-be-configured data streams in a time-slotted style, and update corresponding information in the resource information repository. The selected time slot length is stored in the scheduling scheme repository.

Additionally, the data quality analysis includes, but is not limited to, checks for missing data and format errors.

Additionally, the scheduling engine further includes a queue management unit. The queue management unit is used to buffer the attribute information of to-be-configured data streams and successively incrementally retrieve the data streams one by one.

Additionally, the scheduling engine further includes the time slot selection unit and a parallel determination unit. The time slot selection unit is used to derive a feasible forwarding time slot range for a current to-be-scheduled data stream, successively select feasible forwarding time slots and send them to the parallel determination unit. Moreover, it acquires time slot occupancy information of the current to-be-scheduled stream obtained by the parallel determination unit, perform forwarding time slot filtering based on corresponding time slot occupancy information of different forwarding time slots, add filtering results to the scheduling scheme repository, and update network time slot occupancy information in the resource information repository. When the filtering fails, the time slot selection unit issues an error warning signal and deactivates the scheduling engine.

Additionally, the parallel determination unit is used to make determinations as to time slot occupancy at corresponding forwarding time slots of a current to-be-scheduled stream, activate a number of determination units in a parallel determination manner, which independently conduct corresponding time slot occupancy determinations and checks, and send summarized time slot occupancy information to the time slot selection unit.

Beneficial effects of the present invention over the prior art include, but are not limited to:

1. The present invention entails two different parallel scheduling methods, which are hyperperiod based and conflict-graph based and suitable for use in stream number complex and stream attribute complex application scenarios, respectively. On a dedicated hardware platform with limited on-chip resources, its parallel computing ability can be brought into full play, facilitating rapid generation of a scheduling scheme.
2. The present invention entails an engine capable of efficient, deterministic TSN scheduling. By means of a highly parallel scheduling method based on a dedicated hardware platform, scheduling complexity is significantly reduced, making the scheduling engine applicable to large-scale network scenarios.
3. In the present invention, a collaborative architecture is designed, with a main part of the configuration unit being separated from the scheduling engine. By means of hardware acceleration of the scheduling engine, rapid generation and configuration of a scheduling scheme is achieved.

Below, the concept, structural details and resulting technical effects of the present invention will be further described with reference to the accompanying drawings to provide a full understanding of the objects, features and effects of the invention.

DETAILED DESCRIPTION OF THE PREFERRED EMBODIMENTS

Below, the accompanying drawings of this specification are referenced to introduce many preferred embodiments of the present invention so that the techniques thereof become more apparent and readily understood. The present invention may be embodied in many different forms of embodiment, and the protection scope of the invention is not limited only to the embodiments mentioned herein.

Figure 1:
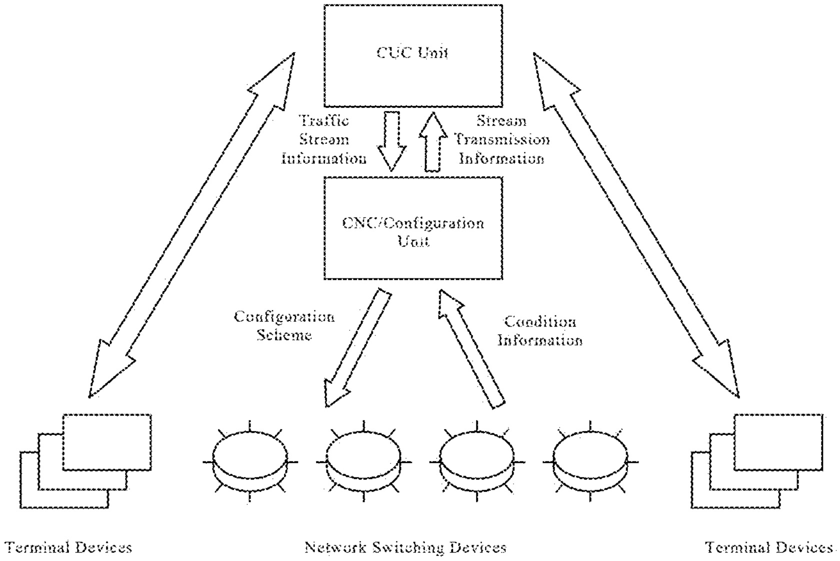
FIG. 1 is a diagram showing a centralized TSN configuration architecture according to a preferred embodiment of the present invention.

A first embodiment of the present invention is applied to typical industrial control scenarios in a steel mill, including steel plate processing and laminar cooling, in which a large number of sensors and controllers are deployed in a production workshop for processing, safety monitoring and other key processes. In order to ensure real-time and reliable information exchange between these terminal devices and hence safe and efficient production, a time-sensitive network (TSN) is established for networking and information transmission among the devices, in which associated time-sensitive switches or gateways are used as network switching devices, and the centralized user configuration (CUC)/centralized network configuration (CNC) architecture shown in FIG. 1 for configuration and management of the terminal and gateway devices.

Figure 2:
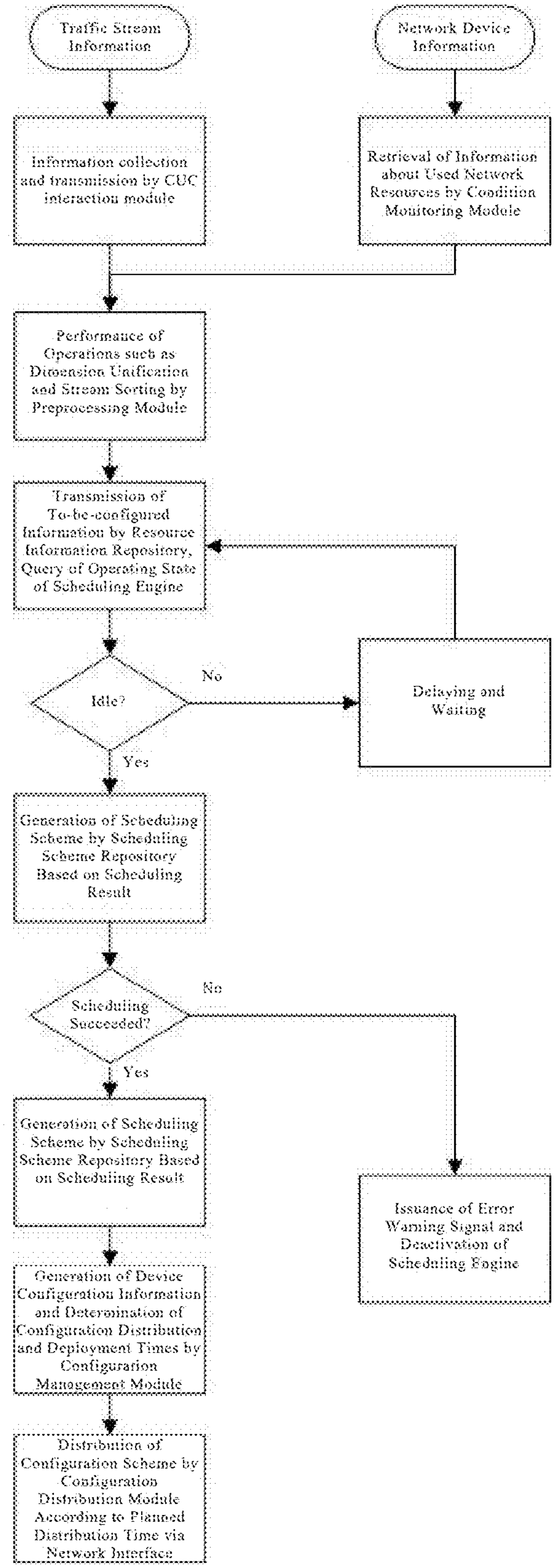
FIG. 2 is a flowchart of steps in a method according to a preferred embodiment of the present invention.

In this embodiment, the network switching devices are 8 switches, and the terminal devices are 5 sensors/controllers corresponding to five respective communication data streams $\{f_1, f_2, f_3, f_4, f_5\}$. In this embodiment, a method for efficient configuration of the TSN based on hardware acceleration is implemented, which specifically proceeds as shown in FIG. 2 and essentially includes the steps of:

- in an acquisition step, acquiring attribute information of the data streams;
- in a preprocessing step, preprocessing the acquired attribute information of the data streams to derive attribute information of to-be-configured data streams;
- in a scheduling step, based on the attribute information of to-be-configured data streams, selecting a time slot length, calculating a hyperperiod therefrom, and performing corresponding parallel scheduling based on a size of the hyperperiod, thereby obtaining a scheduling result;
- in a generation step, generating a scheduling scheme based on the scheduling result and further generating a configuration scheme;
- in a deployment step, deploying the configuration scheme to the network devices.

A specific process is as follows.

In the acquisition step, a CUC unit collects requests for transmission of the traffic streams from the terminal devices and acquires attributes of the data streams to be transmitted. The attributes and values thereof are as shown in Table 1. The data streams $f_i$ constitute a data stream set F and are passed to a CUC interaction unit in a CNC configuration unit. At the same time, a condition monitoring unit in the CNC configuration unit acquires information about available resources of the network switching devices at the site, such as buffer queue capacity and network interface rate, and sends it together with the attribute information of data streams to a configuration management unit.

TABLE 1

Attributes of Data Streams

| Attribute Name | Attribute $\{f_1, f_2, f_3, f_4, f_5\}$ |
|---|---|
| Sending period $sper_i$ | {500, 1000, 1500, 2000, 3000} μs |
| Packet size $msiz_i$ | {100, 200, 100, 200, 100} bytes |
| Worst-case latency requirement $wdel_i$ | {0.5, 0.6, 0.7, 0.8, 0.9} × period $sper_i$ |
| Source/destination terminal devices accessed | {1, 4}, {2, 5}, {3, 6}, {4, 7}, {5, 8} |
| Network routing information $nrou_i$ | {1, 2, 3, 4}, {2, 3, 4, 5}, {3, 4, 5, 6}, {4, 5, 6, 7}, {5, 6, 7, 8}, |
| Device condition information | Buffer queue capacity qcap 20 Mb, network interface rate irat 1 Gb/s |

In the preprocessing step, a preprocessing unit in the configuration management unit performs preprocessing operations on the attribute information of data streams, such as dimension unification and stream sorting by sending period, packet length or another attribute. As packet lengths corresponding to the Nos. 1, 2, 3, 4, 5 data streams are 100, 200, 100, 200, 100, respectively, they are sorted as 1, 3, 5, 2, 4. Such preprocessing is weakly relevant to time sensitivity, so this step is beneficial but not mandatory. The resulting new data stream sequence $\{f_1, f_3, f_5, f_2, f_4\}$ forms information of to-be-configured traffic and is mounted together with the network available resources onto an information exchange module such as a PCIe bus.

A hardware accelerator module monitors and acquires the request and data signals from the bus and checks the state of a scheduling engine. If the state is "idle", it responds to the request signal, acquires the to-be-configured information mounted on the information exchange module and stores it in a scheduling resource repository. The state is then set to "busy". If the hardware accelerator is busy, the signals from the configuration management unit will be rejected.

Figure 3:
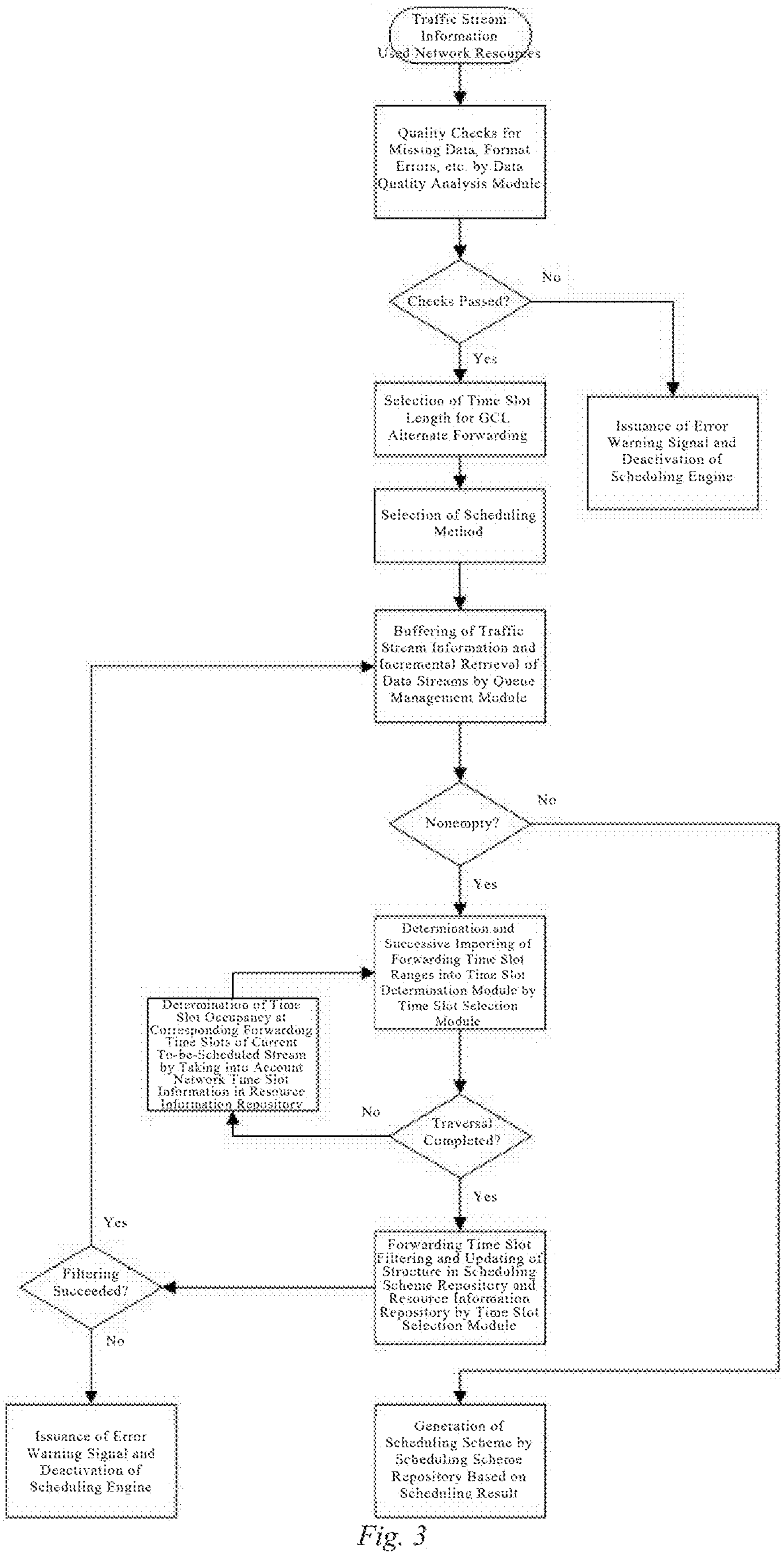
FIG. 3 is a flowchart of a scheduling process according to a preferred embodiment of the present invention.

As shown in FIG. 3, in the scheduling step, the scheduling engine retrieves information of the to-be-configured traffic and network resources from a resource information repository and conducts data quality analysis such as checks for missing data and format errors. If the data quality is determined as being problematic, the scheduling engine will stop and return to the idle state. If the data quality checks are passed, the control proceeds to scheduling time slot selection.

Based on the attribute information of the to-be-configured traffic, a time slot length is selected using the method detailed below. Moreover, based on the selected time slot length, the sending periods and worst-case latency requirements of the to-be-configured traffic are represented in a time-slotted style as detailed below. The corresponding traffic attributes are updated in the resource information repository, and the selected time slot length is stored in a scheduling scheme repository.

The time slot length is selected according to:

$$SP^n = \{sper_1, sper_2, \ldots, sper_n\}, ST = gcd(SP^n),$$

i.e., $$SP^5 = \{500, 1000, 1500, 2000, 3000\}, ST = gcd(SP^5) = 500\ \mu s,$$

where gcd denotes determining the greatest common divisor.

The time-slotted representations are derived by:

$$\forall s_i \in S:$$

$$sper_i^{ST} = \frac{sper_i}{ST}, wdel_i^{ST} = \left\lfloor \frac{wdel_i}{ST} \right\rfloor,$$

i.e., $$sper_1^{ST} = \frac{sper_1}{ST} = \frac{500}{500} = 1, sper_2^{ST} = \frac{sper_2}{ST} = \frac{1000}{500} = 2,$$

$$sper_3^{ST} = \frac{sper_3}{ST} = \frac{1500}{500} = 3, sper_4^{ST} = \frac{sper_4}{ST} = \frac{2000}{500} = 4,$$

$$sper_5^{ST} = \frac{sper_5}{ST} = \frac{3000}{500} = 6,$$

$$wdel_1^{ST} = \left\lfloor \frac{wdel_1}{ST} \right\rfloor = \left\lfloor \frac{0.5*500}{500} \right\rfloor = 0,$$

$$wdel_2^{ST} = \left\lfloor \frac{wdel_2}{ST} \right\rfloor = \left\lfloor \frac{0.6*1000}{500} \right\rfloor = 1,$$

$$wdel_3^{ST} = \left\lfloor \frac{wdel_3}{ST} \right\rfloor = \left\lfloor \frac{0.7*1500}{500} \right\rfloor = 2,$$

$$wdel_4^{ST} = \left\lfloor \frac{wdel_4}{ST} \right\rfloor = \left\lfloor \frac{0.8*2000}{500} \right\rfloor = 3,$$

$$wdel_5^{ST} = \left\lfloor \frac{wdel_5}{ST} \right\rfloor = \left\lfloor \frac{0.9*3000}{500} \right\rfloor = 5,$$

where $\lfloor\ \rfloor$ denotes rounding down a number to the nearest integer.

Subsequently, based on the attribute information of the to-be-configured traffic, a corresponding parallel scheduling method is selected. If a hyperperiod of the to-be-configured traffic is smaller than a predetermined value, the traffic set to be configured will be determined as being stream number complex, and hyperperiod based parallel scheduling will be selected. If the hyperperiod is greater than the value, the traffic set will be determined as being stream attribute complex, and conflict-graph based parallel scheduling will be selected. The hyperperiod HP in the determination basis is calculated according to:

$$HP = \frac{lcm(SP^n)}{ST}.$$

In this embodiment, $$HP = \frac{lcm(SP^5)}{ST} = 12,$$

where lcm denotes determining the least common multiple.

Figure 4:
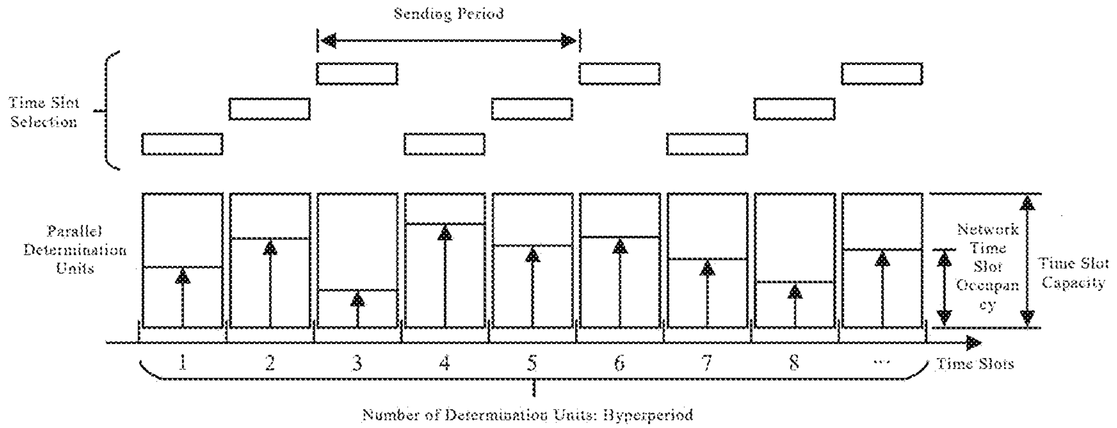
FIG. 4 is a schematic diagram showing hyperperiod based parallel scheduling according to a preferred embodiment of the present invention.

In the scheduling step, if hyperperiod based parallel scheduling is implemented, then as shown in FIG. 4, the following steps are carried out.

A queue management unit successively retrieves the data streams according to the sorted order of them $\{f_1, f_3, f_5, f_2, f_4\}$ in the preprocessing unit for incremental scheduling. Moreover, it calculates the least common multiple of the sending periods of the to-be-configured traffic as the hyperperiod HP and sends it to parallel determination units. The hyperperiod may be derived as described above.

A time slot selection unit derives, based on the sending periods and worst-case latency requirements of the data streams, the following feasible forwarding time slot ranges $offt_i$, and successively sends them to the parallel determination units.

$$offt_i \in \{0,1, \ldots, \min\{wdel_i^{ST}, sper_i^{ST} - 1\}\},$$

i.e., $$offt_1 \in \{0,1, \ldots, \min\{wdel_1^{ST}, sper_1^{ST}\}\} = \{0, \ldots, \min\{0,0\}\} = \{0\},$$

$$offt_2 \in \{0,1, \ldots, \min\{wdel_2^{ST}, sper_2^{ST}\}\} = \{0,1, \ldots, \min\{1,1\}\} = \{0,1\},$$

$$offt_3 \in \{0,1, \ldots, \min\{wdel_3^{ST}, sper_3^{ST}\}\} = \{0,1, \ldots, \min\{2,2\}\} = \{0,1,2\},$$

$$offt_4 \in \{0,1, \ldots, \min\{wdel_4^{ST}, sper_4^{ST}\}\} = \{0,1, \ldots, \min\{3,3\}\} = \{0,1,2,3\},$$

$$offt_5 \in \{0,1, \ldots, \min\{wdel_5^{ST}, sper_5^{ST}\}\} = \{0,1, \ldots, \min\{5,5\}\} = \{0,1,2,3,4,5\}.$$

The parallel determination units monitor the hyperperiod signal sent from the queue management unit, and a corresponding number of the parallel determination units are activated. A determination is made as to time slot occupancy of each transmission link $(v_a,v_b)$ at the corresponding forwarding time slots for current to-be-scheduled streams by taking into account network time slot occupancy information of scheduled traffic in the resource information repository. Each parallel determination unit independently determines whether a respective one of the time slots sl within the range of the hyperperiod is occupied and checks the corresponding time slot occupancy, as detailed below. At last, the parallel determination units summarize the time slot occupancy information and send it back to the time slot selection unit.

The time slot occupancy determination is made according to:

$$\forall (v_a, v_b) \in$$

$$nrou_i: (sl)\bmod gcd(sper_i^{ST}) \equiv \left(ldel_i^{(v_a,v_b)} + offt_i\right)\bmod gcd(sper_i^{ST}) \mapsto \text{yes},$$

where $$ldel_i^{(v_a,v_b)}$$

represents a transmission delay of the current to-be-scheduled stream caused by transmission over the link $(v_a,v_b)$, measured in time slot lengths ST, and mod denotes a remainder operation. Taking the data stream $f_5$ as an example, in case of the feasible forwarding time slot $offt_5$ being selected as 0, time slot determination results are obtained as follows.

Transmission delays $$ldel_i^{(v_a,v_b)}$$

of the data stream $f_5$ occurring in the transmission paths are:

| | Link | | |
|---|---|---|---|
| Delay | (5, 6) | (6, 7) | (7, 8) |
| $Idel_5$ | 1 | 2 | 3 |

Accordingly, the time slot determination results are obtained as:

| | Time Slot | | | | | | | | | | | |
|---|---|---|---|---|---|---|---|---|---|---|---|---|
| Link | 0 | 1 | 2 | 3 | 4 | 5 | 6 | 7 | 8 | 9 | 10 | 11 |
| (5, 6) | — | yes | — | — | — | — | — | yes | — | — | — | — |
| (6, 7) | — | — | yes | — | — | — | — | — | yes | — | — | — |
| (7, 8) | — | — | — | yes | — | — | — | — | — | yes | — | — |

Each column of results in this table is independently obtained by one determination unit. Taking the determination result in the first row and the first column as an example, it is specifically calculated in the following manner.

As $$sl = 0,\ \ Idel_5^{(5,6)} = 1,\ \ offt_5 = 0,\ \ sper_5^{ST} = 6,$$

where $$\omega_{sl}^{(v_a,v_b)}$$

represents an occupied amount of the time slot. Taking the data stream $f_5$ as an example, in case of the feasible forwarding time slot $offt_5$ being selected as 0 and the forwarding time slots for the scheduled data streams $f_1$, $f_3$ being selected by filtering as 0 and 0, results of the time slot occupancy amount check are obtained as:

Occupied amount of time slot $$\omega_{sl}^{(v_a,v_b)}$$

(obtained from completed scheduling steps):

| | Time Slot | | | | | | | | | | | |
|---|---|---|---|---|---|---|---|---|---|---|---|---|
| Link | 0 | 1 | 2 | 3 | 4 | 5 | 6 | 7 | 8 | 9 | 10 | 11 |
| (5, 6) | 100 | 0 | 0 | 100 | 0 | 1 | 100 | 0 | 1 | 100 | 0 | 0 |
| (6, 7) | 0 | 0 | 0 | 0 | 0 | 1 | 0 | 0 | 0 | 0 | 0 | 0 |
| (7, 8) | 0 | 0 | 0 | 0 | 0 | 0 | 0 | 0 | 0 | 0 | 0 | 0 |

To-be-occupied amount of time slot $$\omega_{sl,offt_5}^{(v_a,v_b)}:$$

| | Time Slot | | | | | | | | | | | |
|---|---|---|---|---|---|---|---|---|---|---|---|---|
| Link | 0 | 1 | 2 | 3 | 4 | 5 | 6 | 7 | 8 | 9 | 10 | 11 |
| (5, 6) | 100 | 100 | 0 | 100 | 0 | 0 | 100 | 100 | 0 | 100 | 0 | 0 |
| (6, 7) | 0 | 0 | 100 | 0 | 0 | 0 | 0 | 0 | 100 | 0 | 0 | 0 |
| (7, 8) | 0 | 0 | 0 | 100 | 0 | 0 | 0 | 0 | 0 | 100 | 0 | 0 |

the above formula gives $$(sl)\bmod gcd(sper_5^{ST}) = 0 \bmod 6 = 0,$$

$$\left(Idel_i^{(v_a,v_b)} + offt_i\right)\bmod gcd(sper_i^{ST}) = (1+0)\bmod 6 = 1.$$

As the congruence condition is not satisfied, the concerned time slot is not to be occupied.

An amount of time slot occupancy $$\omega_{sl,offt_i}^{(v_a,v_b)}$$

when the time slot is to be occupied is checked according to:

$\forall(v_a,v_b)\in nrou_i$:

$$\omega_{sl,offt_i}^{(v_a,v_b)} = \omega_{sl}^{(v_a,v_b)} + msize_i,$$

The time slot selection unit acquires the time slot occupancy information from the parallel determination units until all the feasible forwarding time slots have been checked. At this point, the time slot selection unit carries out the following forwarding time slot filtering based on the time slot occupancy information, and stores filtering results in the scheduling scheme repository, updating the corresponding time slot occupancy information in the resource information repository. If the filtering fails, the scheduling engine will stop and the hardware accelerator module will return to the idle state.

The foregoing hyperperiod based parallel scheduling step is repeated until the to-be-configured traffic set becomes empty as monitored by the queue management unit. After that, the following actions are taken.

Forwarding time slot filtering is performed according to:

$$\underset{offt_i}{\operatorname{argmin}}\ \max_{(v_a,v_b),sl} \omega_{sl,offt_i}^{(v_a,v_b)} \mapsto offt_i.$$

Taking the data stream $f_5$ as an example, in case of the feasible forwarding time slot $offt_5$ being selected as 0 and the forwarding time slots for the scheduled data streams $f_1$, $f_3$ 0 and 0, we have $$\max_{(v_a,v_b),sl} \omega_{sl,offt_5}^{(v_a,v_b)} = 100$$

according to the above table. For the forwarding time slots within the feasible range, we have:

| Feasible forwarding time slot $offt_5$ | 0 | 1 | 2 | 3 | 4 | 5 |
|---|---|---|---|---|---|---|
| $\max_{(v_a,v_b),sl} \omega_{sl,offt_5}^{(v_a,v_b)}$ | 100 | 100 | 200 | 100 | 100 | 200 |

Thus, the forwarding time slot filtering result is obtained as $offt_5=0$.

Failure of filtering is determined according to:

$$\min_{offt_i} \max_{(v_a,v_b),sl} \omega_{sl,offt_i}^{(v_a,v_b)} > \min\{ST \times irat,\ qcap\}.$$

Specifically, since $$\min\{ST \times irat,\ qcap\} = \min\{500\ \mu s \times 1\frac{Gb}{s},\ 20Mb\} = 62500 \text{ bytes},$$

the concerned filtering failure check is not passed.

The resource information repository is updated according to:

$$\forall (v_a, v_b) \in nrou_i:$$

$$\omega_{sl}^{(v_a,v_b)} = \omega_{sl}^{(v_a,v_b)} + msize_i.$$

That is, the occupied amount of time slot $$\omega_{sl}^{(v_a,v_b)}$$

is updated as:

| | Time Slot | | | | | | | | | | | |
|---|---|---|---|---|---|---|---|---|---|---|---|---|
| Link | 0 | 1 | 2 | 3 | 4 | 5 | 6 | 7 | 8 | 9 | 10 | 11 |
| (5, 6) | 100 | 100 | 0 | 100 | 0 | 0 | 100 | 100 | 0 | 100 | 0 | 0 |
| (6, 7) | 0 | 0 | 100 | 0 | 0 | 0 | 0 | 0 | 100 | 0 | 0 | 0 |
| (7, 8) | 0 | 0 | 0 | 100 | 0 | 0 | 0 | 0 | 0 | 100 | 0 | 0 |

Figure 5:
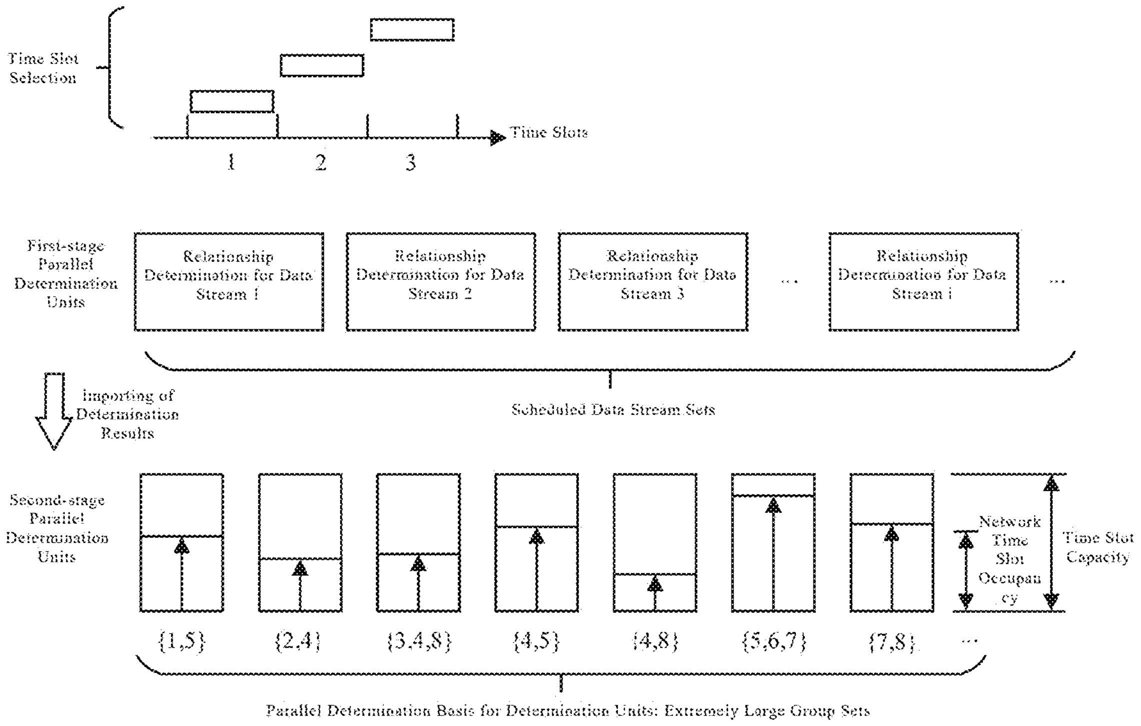
FIG. 5 is a schematic diagram showing conflict-graph based parallel scheduling according to a preferred embodiment of the present invention.

In the scheduling step, if conflict-group based parallel scheduling is implemented, then as shown in FIG. 5, the following steps are carried out.

The queue management unit successively retrieves the data streams according to the sorted order of them in the preprocessing unit for incremental scheduling.

The time slot selection unit derives, based on the sending periods and worst-case latency requirements of the data streams, the following feasible forwarding time slot ranges $offt_i$, and successively sends them to the parallel determination units.

$$offt_i \in \{0,1, \ldots , \min\{wdel_i^{ST},\ sper_i^{ST} - 1\}\}$$

i.e., $$offt_1 \in \{0,1, \ldots , \min\{wdel_1^{ST},\ sper_1^{ST}\}\} = \{0, \ldots , \min\{0,0\}\} = \{0\},$$

$$offt_2 \in \{0,1, \ldots , \min\{wdel_2^{ST},\ sper_2^{ST}\}\} = \{0,1, \ldots , \min\{1,1\}\} = \{0,1\},$$

$$offt_3 \in \{0,1, \ldots , \min\{wdel_3^{ST},\ sper_3^{ST}\}\} = \{0,1, \ldots , \min\{2,2\}\} = \{0,1,2\},$$

$$offt_4 \in \{0,1, \ldots , \min\{wdel_4^{ST},\ sper_4^{ST}\}\} = \{0,1, \ldots , \min\{3,3\}\} = \{0,1,2,3\},$$

$$offt_5 \in \{0,1, \ldots , \min\{wdel_5^{ST},\ sper_5^{ST}\}\} = \{0,1, \ldots , \min\{5,5\}\} = \{0,1,2,3,4,5\}.$$

Taking into account network time slot occupancy information of scheduled traffic in the resource information repository, the parallel determination units make two-stage determinations as to time slot occupancy under the corresponding forwarding time slots for the current to-be-scheduled streams.

A first-stage parallel determination unit independently determines a time slot occupancy relationship between current to-be-scheduled traffic and scheduled traffic according to the following determination conditions. Each parallel determination unit corresponds to one scheduled data stream, and the number of activated parallel determination units increases with scheduled traffic.

The first-stage determination is made according to:

$$\forall (v_a, v_b) \in nrou_i \cap nrou_j:\ \left(ldel_i^{(v_a,v_b)} + offt_i\right) \mathrm{mod}\, gcd\left(sper_i^{ST},\ sper_j^{ST}\right) \equiv \left(ldel_j^{(v_a,v_b)} + offt_j\right) \mathrm{mod}\, gcd\left(sper_i^{ST},\ sper_j^{ST}\right) \mapsto \text{yes},$$

where $(v_a,v_b)$ represents a transmission link co-occupied by the current to-be-scheduled data stream $s_i$ and a scheduled data stream $s_j$. Taking the data stream $f_5$ as an example, in case of the feasible forwarding time slot $offt_5$ being selected as 2 and the forwarding time slots of the scheduled data streams $f_1$, $f_3$ being selected by filtering as 0 and 0, a result of the first-stage determination is derived as follows:

1) for the data stream $f_1$, $nrou_1 \cap nrou_5 = \emptyset$, indicating there is no time slot co-occupancy between the two data streams;

2) for the data stream $f_3$, as $$nrou_1 \cap nrou_5 = \{(5, 6)\},$$

$$\left(ldel_5^{(5,6)} + offt_5\right) \bmod gcd\left(sper_5^{ST},\ sper_3^{ST}\right) = (1 + 2) \bmod gcd\ (6, 3) = 0,$$

$$\left(ldel_3^{(5,6)} + offt_3\right) \bmod gcd\left(sper_5^{ST},\ sper_3^{ST}\right) = (3 + 0) \bmod gcd\ (6, 3) = 0,$$

which satisfy the congruence condition, indicating there is time slot co-occupancy between the two data streams.

Based on the results from the first stage, a second-stage parallel determination unit performs the following set operations with conflict group sets $CS^{(v_a,v_b)}$ reflecting time slot occupancy of the individual links by scheduled data stream sets. Wherein, a corresponding occupied amount of time slot $$\zeta_{\varpi,offt_i}^{(v_a,v_b)}$$

is obtained from a conflict group $\overline{\varpi}\in CS^{(v_a,v_b)}$. Finally, the above information is summarized by the parallel determination units and fed back to the time slot selection unit.

The first-stage results are summarized according to:

$$\varkappa^{(v_a,v_b)}=\{f_j|f_j \text{ is determined as yes with } f_i\}.$$

Specifically, $\varkappa^{(5,6)}=\{f_3\}$, $\varkappa^{(6,7)}=\{\ \}$, $\varkappa^{(7,8)}=\{\ \}$.

The second-stage determination is made according to:

$$\zeta_{\overline{\varpi},offt_i}^{(v_a,v_b)} = msize_i + \sum\nolimits_{s_j\in\overline{\varpi}\cap\varkappa^{(v_a,v_b)}} msize_j.$$

Specifically, conflict sets $CS^{(v_a,v_b)}$ for the scheduled data streams are:

| $CS^{(5,6)}$ | $CS^{(6,7)}$ | $CS^{(7,8)}$ |
|---|---|---|
| $\{\{f_3\}\}$ | $\{\ \}$ | $\{\ \}$ |

The occupied amount of time slot $$\zeta_{\varpi,offt_5}^{(v_a,v_b)}$$

obtained as:

| Link | (5,6) | (6,7) | (7,8) |
|---|---|---|---|
| Conflict group $\overline{\varpi}$ | $\{f_3\}$ | {} | {} |
| Occupied amount of time slot $\zeta_{\varpi,offt_5}^{(v_a,v_b)}$ | 200 | 100 | 100 |

Each column of results in this table is independently obtained by one determination unit. Taking the conflict group set $\{\{f_3\}\}$ for the link (5,6) as an example, the calculation is specifically conducted according to:

$$\zeta_{\{f_3\},offt_5}^{(5,6)} = msize_5 + \sum\nolimits_{s_j\in\overline{\varpi}\cap\varkappa^{(v_a,v_b)}} msize_j = 100 + 100 = 200 \text{ bytes.}$$

Next, a time slot occupancy unit acquires the time slot occupancy information from the parallel determination units until all the feasible forwarding time slots have been checked. At this point, the time slot selection unit carries out the following forwarding time slot filtering based on the time slot occupancy information, and stores filtering results in the scheduling scheme repository, updating the corresponding time slot occupancy information in the resource information repository. If the filtering fails, the scheduling engine will stop and the hardware accelerator module will return to the idle state.

The foregoing step is repeated until the traffic set to be configured becomes empty as monitored by the queue management unit. After that, the following actions are taken.

Forwarding time slot filtering is performed according to:

$$\min_{offt_i}\max_{(v_a,v_b),\varpi} \zeta_{\varpi,offt_i}^{(v_a,v_b)} \mapsto offt_i.$$

Taking the data stream $f_5$ as an example, in case of the feasible forwarding time slot $offt_5$ being selected as 2 and the forwarding time slots for the scheduled data streams $f_1$, $f_3$ being selected by filtering as 0 and 0, we have $$\max_{(v_a,v_b),\varpi} \zeta_{\varpi,offt_5}^{(v_a,v_b)} = 200 \text{ according}$$

to the above table. For the forwarding time slots within the feasible range, we have:

| Feasible forwarding time slot $offt_5$ | 0 | 1 | 2 | 3 | 4 | 5 |
|---|---|---|---|---|---|---|
| $\max_{(v_a,v_b),\varpi} \zeta_{\varpi,offt_5}^{(v_a,v_b)}$ | 100 | 100 | 200 | 100 | 100 | 200 |

Thus, the forwarding time slot filtering result is obtained as $offt_5=0$.

Failure of filtering is determined according to:

$$\min_{offt_i}\max_{(v_a,v_b),\varpi} \zeta_{\varpi,offt_i}^{(v_a,v_b)} > \min\{ST\times irat,\ qcap\}.$$

Specifically, since $\min\{ST\times irat, qcap\}=\min\{500\ \mu s\times 1\ Gb/s,\ 20\ Mb\}=62500$ bytes, the concerned filtering failure check is not passed.

The resource information repository is updated according to:

$$(\overline{\varpi}\cap\varkappa^{(v_a,v_b)})\cup\{s_i\}\mapsto CS^{(v_a,v_b)}.$$

That is, the conflict sets $CS^{(v_a,v_b)}$ for the scheduled data streams are updated as (when $offt_5=0$, $\varkappa^{(5,6)}=\{\ \}$, $\varkappa^{(6,7)}=\{\ \}$, $\varkappa^{(7,8)}=\{\ \}$):

| $CS^{(5,6)}$ | $CS^{(6,7)}$ | $CS^{(7,8)}$ |
|---|---|---|
| $\{\{f_3\}, \{f_5\}\}$ | $\{\{f_5\}\}$ | $\{\{f_5\}\}$ |

In the generation step, a scheduling completion signal is transmitted to the scheduling scheme repository, deactivating the scheduling engine. The scheduling scheme repository integrates the forwarding time slot filtering results and time slot length information of the data streams to generate a scheduling scheme and mounts it onto an information exchange bus. It also sends a scheduling completion signal to a main control module, causing the hardware accelerator module to return to the idle state. In this embodiment, the scheduling scheme is represented as:

| ST | $offt_1$ | $offt_2$ | $offt_3$ | $offt_4$ | $offt_5$ |
|---|---|---|---|---|---|
| 500 μs | 0 | 0 | 0 | 1 | 0 |

The main control module monitors a scheduling completion signal from the hardware accelerator module and acquires the scheduling scheme information. A deployment design unit generates gate control list (GCL) configuration information by taking into account the scheduling scheme for the network devices and determines distribution and deployment times for the configuration information, forming a configuration scheme. In this embodiment, the configuration scheme is expressed as:

| | | | | | |
|---|---|---|---|---|---|
| GCL configuration information for network devices | Switch 1 Gateopen 500 µs Gateclose 500 µs | | Switch 2 Gateopen 500 µs Gateclose 500 µs | Switch 3 Gateopen 500 µs Gateclose 500 µs | Switch 4 Gateopen 500 µs Gateclose 500 µs |
| | Switch 5 Gateopen 500 µs Gateclose 500 µs | | Switch 6 Gateopen 500 µs Gateclose 500 µs | Switch 7 Gateopen 500 µs Gateclose 500 µs | Switch 8 Gateopen 500 µs Gateclose 500 µs |
| Terminal device configuration information | Terminal device 1 0 µs | Terminal device 2 0 µs | Terminal device 3 0 µs | Terminal device 4 500 µs | Terminal device 5 0 µs |
| Configuration information distribution time | | | 1 µs later | | |
| Configuration information deployment time | | | 1 µs later | | |

In the deployment step, a device distribution unit issues a configuration distribution command according to the planned distribution time and distributes the configuration scheme via a remote network management protocol such as Netconfig configured in the network interface unit, accomplishing configuration of the terminal devices and network devices at the industrial site.

Figure 6:
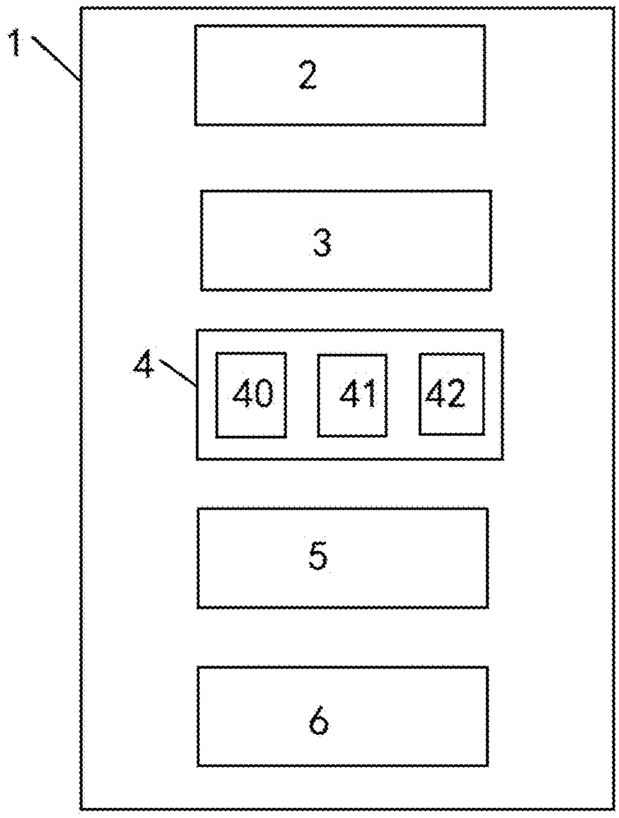
FIG. 6 is a schematic diagram showing the composition of a system according to a preferred embodiment of the present invention.

In a second embodiment of the present invention, there is provided a system 1 for efficient configuration of a time-sensitive network (TSN) based on hardware acceleration, for implementing the method as defined above. As shown in FIG. 6, the system includes an acquisition module 2, a preprocessing module 3, a scheduling module 4, a generation module 5 and a deployment module 6.

The acquisition module 2 is configured to acquire attribute information of data streams.

The preprocessing module 3 is configured to preprocess the attribute information of data streams acquired to derive attribute information of to-be-configured data streams.

The scheduling module 4 is configured to select a time slot length based on the attribute information of to-be-configured data streams, calculate a hyperperiod therefrom, and perform corresponding parallel scheduling based on a size of the hyperperiod, thereby obtaining a scheduling result.

The generation module 5 is configured to generate a scheduling scheme based on the scheduling result and further generate a configuration scheme.

The deployment module 6 is configured to deploy the configuration scheme to network devices.

The scheduling module 4 includes a calculation module 40, a hyperperiod based parallel scheduling module 41 and a conflict-group based parallel scheduling module 42.

The calculation module 40 is configured to calculate time-slotted sending periods based on a sending period of each to-be-configured data streams and on the time slot length and calculate the hyperperiod based on the time-slotted sending periods.

The hyperperiod based parallel scheduling module 41 is configured to:

buffer the attribute information of to-be-configured data streams that has passed data quality checks and successively incrementally retrieve the data streams for scheduling;

derive feasible forwarding time slot ranges based on the sending periods and worst-case latency requirements of the data streams and successively send the feasible forwarding time slot ranges to parallel determination units;

monitor the hyperperiod, activate a corresponding number of the parallel determination units, and make a time slot occupancy determination at a corresponding forwarding time slot of current to-be-scheduled stream by taking into account of network time slot occupancy of scheduled traffic, wherein each parallel determination unit corresponds to one time slot with a range of the hyperperiod and independently determines whether the specific time slot is to be occupied and makes a corresponding time slot occupancy check;

acquire the time slot occupancy amount information, carry out forwarding time slot filtering based on corresponding occupied amounts of time slot at different forwarding time slots, store filtering results and network time slot occupancy information upon the completion of the current traffic scheduling, obtaining the scheduling result, if the filtering fails, terminate the scheduling and sending an error warning signal, causing a hardware accelerator module to return to an idle state.

The conflict-group based parallel scheduling module 42 is configured to:

buffer the attribute information of to-be-configured data streams that has passed data quality checks and successively incrementally retrieve the data streams for scheduling;

derive feasible forwarding time slot ranges based on the attribute information of the data streams, such as their sending periods and worst-case latency requirements.

make two-stage parallel determinations as to time slot occupancy at corresponding forwarding time slots for a current to-be-scheduled stream by taking into account network time slot occupancy information of scheduled traffic, obtaining time slot occupancy amount information;

acquire the time slot occupancy amount information until all the feasible forwarding time slots for the current to-be-scheduled stream have been checked, at this point, carry out forwarding time slot filtering based on the corresponding time slot occupancy amount information at the different forwarding time slots, store filtering results and network time slot occupancy information upon the completion of the current traffic scheduling, obtaining the scheduling result, if the filtering fails, terminate the scheduling and sending an error warning signal, causing the hardware accelerator module to return to the idle state.

Figure 7:
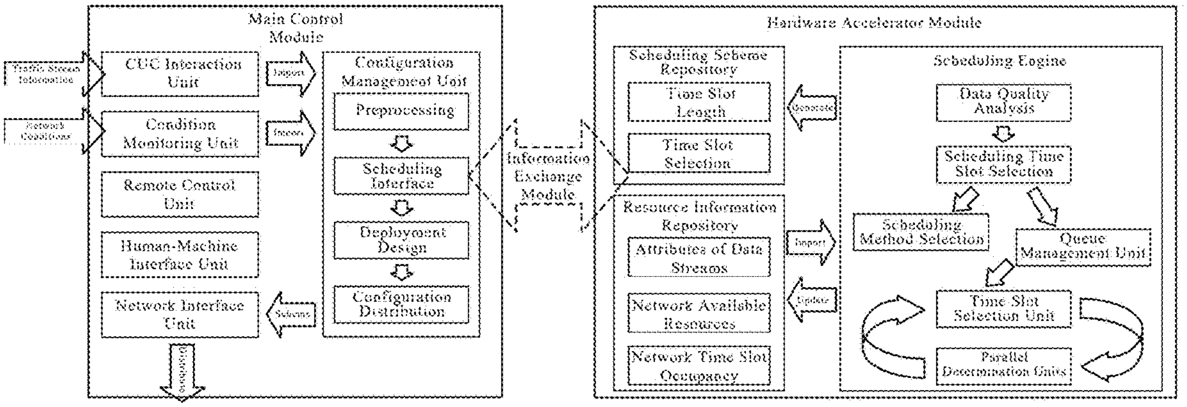
FIG. 7 is a schematic diagram showing the structural composition of a configuration unit according to a preferred embodiment of the present invention, in which, 1 denotes a configuration system; 2, an acquisition module; 3, a preprocessing module; 4, a scheduling module; 5, a generation module; 6, a deployment module; 40, a calculation module; 41, a hyperperiod based parallel scheduling module; and 42, a conflict-group based parallel scheduling module.

In a third embodiment of the present invention, there is also provided a unit for efficient configuration of a time-sensitive network based on hardware acceleration, which, as shown in FIG. 7, includes:

a main control module, used to acquire requests for transmission of traffic data streams from a CUC unit, monitor conditions of devices in a network device layer, and collaborate with a hardware accelerator to acquire a scheduling scheme and design a deployment scheme which is combined therewith into a complete configuration scheme for distribution to the network devices;

the hardware accelerator module, which incorporates a scheduling engine, enables hardware acceleration and collaborates with the main control module via an information exchange module for design of the scheduling scheme and device configuration information;

the information exchange module, used for information exchange between the main control module and the hardware accelerator module and transmission of information of to-be-configured data streams, information of network available resources, the scheduling scheme and the device configuration information.

The main control module includes:

a CUC interaction unit, used to collect requests of transmission of traffic data streams from terminal devices in a CUC unit, pass them to the configuration management unit and feed traffic information of the terminal devices and network device condition information back to the CUC unit;

a condition monitoring unit, used to monitor operating conditions of on-site network devices and traffic stream transmission consistency in the configuration scheme and transmit the network device condition information to the configuration management unit and the CUC interaction unit;

a configuration management unit, used to generate the configuration scheme and issue a configuration distribution command and for co-design of the scheduling scheme with the hardware accelerator module via the information exchange module;

a remote control unit, used to enable remote access and management of the configuration unit;

a human-machine interface unit, used to enable local access and management of the configuration unit;

a network interface unit, which provides a communication interface and maintenance to the remote control, configuration distribution and other functions.

The configuration management unit includes:

a preprocessing unit, used to perform data dimension unification, stream sorting and other preprocessing operations on the information of to-be-configured data streams;

a scheduling interface unit, used to send the preprocessed information of to-be-configured data streams and the information of network available resources to the hardware accelerator module via the information exchange module and acquire the scheduling scheme and network device configuration information fed back from the hardware accelerator module;

a deployment design unit, used to generate GCL configuration information for the network devices by taking into account the scheduling scheme and determine distribution and deployment times for the configuration information, thus forming the configuration scheme;

a configuration distribution unit, used to issue the configuration distribution command according to the planned distribution time and accomplish distribution of the configuration scheme using a remote network management protocol configured in the network interface unit.

The hardware accelerator module includes:

a resource information repository, used to store the network resource information and the information of to-be-configured data streams from the configuration management unit in the main control module, as well as scheduling condition information occurring during operation of the scheduling engine, such as network time slot occupancy information and transmission delays of the data streams;

the scheduling engine, used for generation of the scheduling scheme, parallel acceleration and forwarding time slot selection for each to-be-configured data stream;

a scheduling scheme repository, used to store data stream forwarding time slot selection and other results obtained during operation of the scheduling engine, generate, based thereon, the scheduling scheme, and transmit it back to the configuration management unit in the main control module.

The scheduling engine includes:

a data quality analysis unit, used to perform data quality analysis, such as checks for missing data and format errors, on the information of network available resources and the information of to-be-configured data streams stored in the resource information repository and to issue an error warning signal upon identifying any error;

a scheduling time slot selection unit, used to select a time slot length for GCL alternate forwarding, represent sending periods and worst-case latency requirements of the to-be-configured data streams in a time-slotted style, and update corresponding information in the resource information repository, the selected time slot length being stored in the scheduling scheme repository;

a scheduling method selection unit, used to select an operating method for the scheduling engine, wherein a determination of whether the to-be-configured data stream set is stream number complex or stream attribute complex based on attributes thereof is made, and a corresponding hyperperiod based parallel determination method or conflict-graph based parallel determination method is selected;

a queue management unit, used to buffer the information of to-be-configured data streams and successively incrementally retrieve the data streams one by one;

a time slot selection unit, used to derive a feasible forwarding time slot range for a current to-be-scheduled data stream, successively select feasible forwarding time slots and send them to the parallel determination unit, acquire time slot occupancy information of the current to-be-scheduled stream obtained by the parallel determination unit, perform forwarding time slot filtering based on corresponding time slot occupancy information of different forwarding time slots, add filtering results to the scheduling scheme repository, update network time slot occupancy information in the resource information repository, if the filtering fails, issue an error warning signal and deactivate the scheduling engine;

a parallel determination unit, used to make determinations as to time slot occupancy at corresponding forwarding time slots of a current to-be-scheduled stream, activate a number of determination units in a parallel determination manner, which independently conduct corresponding time slot occupancy determinations and checks, and send summarized time slot occupancy information to the time slot selection unit.

As shown in FIG. 7, the configuration unit is a so-called centralized network configuration (CNC) unit in a TSN. It is generally divided into the main control module, the hardware accelerator module and the information exchange module. The main control module is used to acquire requests for transmission of traffic data streams from the CUC unit, monitor conditions of on-site network devices and collaborate with the hardware accelerator to design a scheduling scheme and a deployment scheme, which are combined into a complete configuration scheme for distribution to the network devices. The hardware accelerator module incorporates the scheduling engine and supports its hardware acceleration and co-design of the scheduling scheme with the main control module. The information exchange module is used for information exchange between the main control module and the hardware accelerator module and transmission of information in relation to the scheduling and configuration processes.

According to the present invention, the main control module may be implemented with a device with high-frequency processing capabilities, such as, but not limited to, a PC, workstation or server. This module includes the CUC interaction unit, the condition monitoring unit, the configuration management unit, the remote control unit, the human-machine interface unit and the network interface unit. The CUC interaction unit is responsible for collecting requests of transmission of traffic data streams from terminal devices in the CUC unit and feeding traffic configuration information of the terminal devices and condition information of network devices back to the CUC unit. The condition monitoring unit is responsible for monitoring conditions of on-site network devices and traffic stream transmission consistency in the configuration scheme, updating network device condition information for the configuration management unit and the CUC interaction unit, and monitoring conditions of the configuration unit and the CUC unit. The configuration management unit is responsible for generating the configuration scheme (including, but not limited to, the scheduling scheme including the network device configuration information and a configuration time scheme) based on attribute information of traffic streams collected by the CUC interaction unit and the network resource information collected by the condition monitoring unit, issuing the configuration distribution command and enabling co-design of the scheduling scheme by virtue of the information exchange module and the hardware accelerator module. The remote control unit is responsible for enabling remote access and management of the configuration unit. The human-machine interface unit is responsible for providing an interface for local access and management of the configuration unit. The network interface unit is responsible for providing a communication interface and maintenance to the remote control, configuration scheme distribution and other functions and enabling distribution of configuration parameters to the on-site network devices via the remote network management protocol such as Netconfig, Restconfig, etc.

The hardware accelerator module may be implemented with a FPGA, DSP or other dedicated hardware platform and is mainly responsible for undertaking computational tasks for the scheduling engine, supporting parallel computation acceleration and enabling co-design of the scheduling scheme by virtue of the information exchange module and the main control module. This module includes the resource information repository, the scheduling engine and the scheduling scheme repository. The resource information repository is responsible for storing the network resource information and attribute information of to-be-configured traffic from the configuration management unit in the main control module, including but not limited to, information of network available time slot resources, source and destination terminal devices of the to-be-configured traffic, routing information, data sending periods, packet sizes, worst-case latency requirements, jitter requirements and other information, storing network scheduling condition information introduced during operation of the scheduling engine, such as network time slot occupancy information of data streams, transmission delays of data streams, etc., and providing the scheduling engine and the scheduling scheme repository with an interface for accessing the above information. The scheduling engine is responsible for specific implementation of the scheduling scheme and parallel acceleration, successively transferring target data streams via the queue management unit to the time slot selection unit for forwarding time slot position selection, making parallel time slot occupancy checks by parallel determination units for each selected feasible forwarding time slot, and storing corresponding time slot occupancy of the forwarding time slot selected from time slot filtering performed on the feasible forwarding time slots in the resource information repository together with other possible network scheduling information. The scheduling scheme repository is responsible for collecting network configuration information including forwarding time slots selected by the scheduling engine for individual data streams and the gated alternate time slot length and composing the scheduling scheme with the information and feeding the scheduling scheme through the information exchange module back to the configuration management unit in the main control module for subsequent management and distribution of the configuration scheme.

The information exchange module may be implemented with a high-speed transceiver bus module, such as, but not limited to, PCIe, and is mainly responsible for two-way information transmission between the configuration management unit in the main control module and the hardware accelerator module, involving transmission of the information of to-be-configured traffic and the network device information from the configuration management unit to the hardware accelerator module for generation of the scheduling scheme and subsequent transmission of the generated scheduling scheme from the hardware accelerator module to the configuration management unit for deployment design and distribution.

The subject matter of the present application may be provided as a system, method, device and/or computer program product. The computer program product may include a computer-readable storage medium storing thereon computer-readable program instructions for causing a processor to implement various aspects of this application.

In some embodiments, the present application also provides a computer device, apparatus or terminal. The computer device, apparatus or terminal includes, connected by a system bus, a processor, a memory, a network interface, a display screen and an input device. The processor is used to provide computing and control capabilities, and the memory includes a non-volatile storage medium and an internal memory. The non-volatile storage medium stores thereon an operating system and a computer program. The internal memory provides an environment in which the operating system and computer program in the non-volatile storage medium can run. The network interface is used to communicate with external terminals via a network connection. When executed by the processor, the computer program implements the various methods, processes and steps disclosed herein. Alternatively, when executed by the processor, the computer program performs the functions of the various modules or units in the embodiments disclosed therein. The display screen may be a liquid crystal display screen or an electronic ink display screen. The input device may be a touch layer covered on the display screen, or buttons, a trackball or touchpad disposed on a casing, or an external keyboard, touch panel, mouse, etc.

As an example, the computer program may be divided into one or more modules or units, which are stored in the memory and can be executed by the processor to implement the subject matter of this application. These modules or units may be a series of computer program instruction segments capable of performing particular functions. The instruction segments are used to describe a process of execution of the computer program in the device, apparatus or terminal.

The aforementioned device, apparatus or terminal may be a desktop computer, notebook, mobile electronic device, palmtop PC, cloud server or other computing device. Those skilled in the art will appreciate that the structures shown in the figures are merely block diagrams of some structures in relation to the subject matter of this application and does not limit the device, apparatus or terminal to which the subject matter of the application is applied. In practice, the device, apparatus or terminal may include more or less components than as shown in the figures, or combine some components, or have a different arrangement of components.

The processor may be a central processing unit (CPU), or other general- or special-purpose processor, microprocessor, digital signal processor (DSP), application specific integrated circuit (ASIC), field-programmable gate array (FPGA), or other programmable logic device, discrete gate or transistor-transistor logic device, discrete hardware component, etc. The processor is a control center of the aforementioned device, apparatus or terminal, which connects various parts of the device, apparatus or terminal using various interfaces and connections.

The memory may be used to store computer programs, modules and data, and the processor implements various functions of the device, apparatus or terminal by running or executing the computer programs and/or modules stored in the memory and retrieving the data stored in the memory. The memory may essentially include a program storage area and a data storage area. The program storage area may store the operating system, an application program required by at least one function (e.g., for playback of a sound, image or the like), etc. The data storage area may store various types of data (e.g., multimedia data, documents, operation history, etc.) created depending on applications. In addition, the memory may include a high-speed random access memory or non-volatile memory, such as a hard disk drive, internal memory, plug-in hard disk, smart media card (SMC), secure digital (SD) card, flash card, magnetic disk storage device, flash memory device or other volatile solid-state storage device.

The present application also provides a computer-readable storage medium storing thereon a computer program, which implements steps in the above-described methods when executed by a processor. Those of ordinary skill in the art will appreciate that some or all the processes in the methods of the above embodiments may be implemented by associated hardware under instruction of the computer program. The computer program may be stored on a non-volatile computer-readable storage medium. The computer program, when executed, may include processes in the above-described various method embodiments. Any reference to memory, storage, database, or other medium used in the embodiments provided herein may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct bus dynamic RAM (DRDRAM), memory bus dynamic RAM (RDRAM), etc.

The modules and units integrated in the above-described apparatus or terminal device, when implemented in the form of software functional components and sold or used as a separate product, may be stored in a computer-readable storage medium. With this in mind, all or some processes in the various methods disclosed herein may also be implemented by associated hardware under instruction of a computer program. This computer program may be stored in a computer-readable storage medium and, when executed by a processor, can implement steps in the above-described various methods. The computer program may include computer program code possibly, among others, in the format of source code, object code, an executable file, or in some intermediate form. The computer-readable medium may include any entity or device, recording medium, USB flash drive, removable hard disk, magnetic disk, optical disk, computer memory, read-only memory (ROM), random access memory (RAM), electric carrier signal, telecommunication signal, software distribution medium or the like capable of carrying the computer program code. It is to be noted that the content contained in the computer-readable medium can be appropriately increased or decreased according to the requirements of legislation and patent practice in the jurisdiction.

In some embodiments, the various methods, processes, modules, devices, apparatuses or system disclosed herein may be implemented or executed in one or more processing means (e.g., digital processors, analog processors, digital circuits designed for information processing, analog circuits designed for information processing, state machines, computing devices, computers and/or other mechanisms for processing information electronically). The one or more processing means may include one or more devices that perform some or all operations in a method in response to instructions stored electronically on an electronic storage medium. The one or more processing means may include one or more devices configured and specifically designed by hardware, firmware and/or software to perform some or all operations in a method. Presented above are merely preferred particular embodiments of the present application, but the scope of protection of the application is not limited thereto. Equivalent substitutions or changes made by any person familiar with the art within the technical scope of the disclosure herein in light of the subject matter and inventive concept of this application shall be embraced within the scope of protection of the application.

Embodiments of this application may be implemented in hardware, firmware, software, or various combinations thereof, or as instructions stored on a machine-readable medium, which can be read and executed by one or more processing devices. In some implementations, a machine-readable medium may include various mechanisms for storing and/or transmitting information in a form that may be read by a machine (e.g., a computing device). For example, a machine-readable storage medium may include read-only memory, random access memory, magnetic disk storage media, optical storage media, flash memory devices, and other media for storing information, and a machine-readable transmission medium may include forms of propagated signals (including carrier waves, infrared signals, digital signals) and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from machines, computing devices, processing devices, processors, controllers, or other devices or machines executing the firmware, software, routines, or instructions.

In the claims and description of the present application, a module for performing a specified function, or a module described with functional features, is intended to cover any means capable of performing the function, such as a combination of circuit elements for performing the function, software, hardware and a combination of software and hardware for performing or implementing the function, or any form of software, firmware, code and a combination thereof with an appropriate circuit or other device. Functions provided by various modules are combined together in the manner as claimed in the claims, so any modules, components or elements capable of providing those functions are to be considered as being equivalent or equally effective to the modules defined in the claims. According to the principles of equivalent transformations of electric circuits, circuit structures in some embodiments of the present application may be changed or modified, for example, by substituting a current source with a voltage source, or by replacing a series connection structure with a parallel connection structure, or otherwise, into more diverse embodiments. However, these changes and modifications are all within the scope of disclosure of the present application.

In summary, in order to overcome shortcomings of conventional TSN configuration implementations, the present invention provides a method, system and unit for efficient configuration of a large-scale TSN with complex traffic, which can derive global deterministic scheduling and configuration schemes and enables rapid distribution and deployment thereof within a very short time based on conditions of on-site network and terminal devices.

Preferred specific embodiments have been described in detail above. It is to be understood that, those of ordinary skill in the art, without the need for creative effort, can make various modifications and changes, based on the concept of the present invention. Accordingly, all the technical solutions that can be obtained by those skilled in the art by logical analysis, inference or limited experimentation in accordance with the concept of the invention on the basis of the prior art are intended to fall within the protection scope as defined by the claims.

The invention claimed is:

1. A method for efficient configuration of a time-sensitive network based on hardware acceleration, comprising the steps of:

in an acquisition step, acquiring attribute information of data streams;

in a preprocessing step, preprocessing the attribute information of data streams acquired to derive attribute information of to-be-configured data streams;

in a scheduling step, selecting a time slot length based on the attribute information of to-be-configured data streams, calculating a hyperperiod therefrom, and performing corresponding parallel scheduling based on a size of the hyperperiod, thereby obtaining a scheduling result;

in a generation step, generating a scheduling scheme based on the scheduling result and further generating a configuration scheme;

in a deployment step, deploying the configuration scheme to network devices;

wherein the preprocessing step comprises:

conducting dimension unification on the attribute information of data streams and sorting the streams, the attribute information of data streams comprising information of requests for transmission of traffic streams, attributes of the data streams to be transmitted and information of network available resources, and mounting the attribute information of to-be-configured data streams together with the information of network available resources and sending a scheduling request signal; and wherein, when an operating state of a scheduling engine is an idle state, the scheduling request signal is responded to, a to-be-configured quantity information and the information of network available resources that are mounted are acquired, and the operating state of the scheduling engine is set to a busy state; and when the operating state of the scheduling engine is the busy state, the scheduling request signal is not responded to.

2. The method for efficient configuration of a time-sensitive network based on hardware acceleration according to claim 1, wherein the scheduling step comprises:

obtaining time-slotted sending periods through dividing a sending period of each of the to-be-configured data streams by the time slot length;

calculating the hyperperiod based on the time-slotted sending periods.

3. The method for efficient configuration of a time-sensitive network based on hardware acceleration according to claim 2, wherein the scheduling step comprises:

in the event that the hyperperiod is greater than or equal to a threshold, implementing hyperperiod based parallel scheduling, wherein the hyperperiod based parallel scheduling comprises:

buffering the attribute information of to-be-configured data streams that has passed data quality checks and successively incrementally retrieving the data streams for scheduling;

deriving feasible forwarding time slot ranges based on sending periods and worst-case latency requirements of the data streams and successively sending the feasible forwarding time slot ranges to parallel determination units;

monitoring the hyperperiod and activating a corresponding number of the parallel determination units, making a determination as to time slot occupancy at corresponding forwarding time slots of a current to-be-scheduled stream by taking in account an amount of network time slot occupancy by scheduled traffic, wherein each parallel determination unit corresponds to one time slot within a range of the hyperperiod and independently make a determination of whether the specific time slot is to be occupied and a corresponding time slot occupancy check;

acquiring time slot occupancy amount information, performing forwarding time slot filtering based on corresponding amounts of time slot occupancy at different forwarding time slots, storing filtering results and network time slot occupancy information upon completion of current traffic scheduling, obtaining the scheduling result, if the filtering fails, terminating the scheduling and sending an error warning signal, causing a hardware accelerator module to return to an idle state.

4. The method for efficient configuration of a time-sensitive network based on hardware acceleration according to claim 3, wherein determination as to time slot occupancy is made under the condition that, over transmission links for a current to-be-scheduled data stream, if a given specific time slot is congruent with a corresponding forwarding time slot of the current to-be-scheduled stream with respect to a sending period of the current to-be-scheduled data stream, it is indicated that the time slot is to be occupied, and a corresponding amount of time slot occupancy is a sum of packet sizes of all scheduled data stream(s) by which the specific time slot is occupied and of the current to-be-scheduled data stream.

5. The method for efficient configuration of a time-sensitive network based on hardware acceleration according to claim 2, wherein the scheduling step comprises:

in the event that the hyperperiod is smaller than a threshold, implementing conflict-group based parallel scheduling, wherein the conflict-group based parallel scheduling comprises:

buffering the attribute information of to-be-configured data streams that has passed data quality checks and successively incrementally retrieving the data streams for scheduling;

deriving feasible forwarding time slot ranges based on attribute information of the data streams;

making a two-stage parallel determination as to time slot occupancy at corresponding forwarding time slots of a current to-be-scheduled stream by taking in account information of network time slot occupancy by scheduled traffic, obtaining time slot occupancy amount information;

acquiring the time slot occupancy amount information until all feasible forwarding time slots for the current to-be-scheduled stream have been checked, at this point, carrying out forwarding time slot filtering based on the corresponding time slot occupancy amount information at different forwarding time slots, storing filtering results and network time slot occupancy information upon completion of current traffic scheduling, obtaining the scheduling result, if the filtering fails, terminating the scheduling and sending an error warning signal, causing a hardware accelerator module to return to an idle state.

6. The method for efficient configuration of a time-sensitive network based on hardware acceleration according to claim 5, wherein the two-stage parallel determination comprises:

a first-stage determination, the first-stage determination used to determine time slot occupancy relationship between a current to-be-scheduled data stream and scheduled data stream(s), wherein the time slot occupancy relationship is determined under the condition that, if there is an overlapped transmission link in routes for a given specific scheduled data stream and current to-be-scheduled stream, then over the overlapped link, if corresponding forwarding time slots of the two satisfy that the difference between the time slots is divisible by the greatest common divisor of the sending periods of the two data streams, it is indicated that the two data streams will be certainly co-existing in a certain time slot for the link, i.e., there is time slot co-occupancy.

7. The method for efficient configuration of a time-sensitive network based on hardware acceleration according to claim 6, wherein the two-stage parallel determination further comprises:

a second-stage determination, the second-stage determination being implemented to, based on a result of the first-stage determination, perform set operations with conflict group sets reflecting time slot occupancy of scheduled data stream sets over the links, wherein each parallel determination unit corresponds to one of the conflict group sets and independently completes a check of one type of time slot occupancy for a current data stream, wherein the time slot occupancy check is made on the basis of performing an intersection operation between scheduled data stream(s) with time slot co-occupancy with the current to-be-scheduled data stream over transmission links thereof and a particular one of the conflict group sets, adding the current to-be-scheduled stream to the intersection and obtaining the time slot occupancy information by summing packet sizes of the data streams in the set.

8. The method for efficient configuration of a time-sensitive network based on hardware acceleration according to claim 1, wherein the generation step comprises:

generating the scheduling scheme based on the scheduling result;

issuing a scheduling completion signal, setting the operating state of the scheduling engine to the idle state; and in response to the scheduling completion signal, generating gate control list configuration information for the network devices by taking into account the scheduling scheme and determining a distribution time and a deployment time for the configuration information, thereby forming the configuration scheme.

9. The method for efficient configuration of a time-sensitive network based on hardware acceleration according to claim 8, wherein the deployment step comprises:

issuing a configuration distribution command based on the distribution time and distributing the configuration scheme to the network devices using a remote network management protocol, thereby accomplishing the configuration of the network devices.

10. A device for efficient configuration of a time-sensitive network based on hardware acceleration, comprising a memory, a processor and a computer program stored in the memory and executable on the processor, wherein the processor is configured to be able to implement, when executing the computer program, the steps in the method for efficient configuration of a time-sensitive network based on hardware acceleration according to claim 1.

* * * * *